(12) United States Patent
Winey et al.

(10) Patent No.: US 7,265,175 B2
(45) Date of Patent: Sep. 4, 2007

(54) FLAME RETARDANT NANOCOMPOSITE

(75) Inventors: Karen I. Winey, Philadelphia, PA (US); Fangming Du, Upper Darby, PA (US); Reto Haggenmueller, Philadelphia, PA (US); Takashi Kashiwagi, Gaithersburg, MD (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 10/977,642

(22) Filed: Oct. 29, 2004

(65) Prior Publication Data

US 2006/0036016 A1    Feb. 16, 2006

Related U.S. Application Data

(60) Provisional application No. 60/516,614, filed on Oct. 30, 2003.

(51) Int. Cl.
*C08K 3/04* (2006.01)
(52) U.S. Cl. .................................. 524/496; 524/495
(58) Field of Classification Search ......... 524/495–497
See application file for complete search history.

(56) References Cited

U.S. PATENT DOCUMENTS

| | | | |
|---|---|---|---|
| 6,388,046 B1 | 5/2002 | Campbell et al. | 528/198 |
| 6,465,132 B1 | 10/2002 | Jin | 429/231.8 |
| 6,544,463 B1 | 4/2003 | Luzzi et al. | 264/346 |
| 6,689,835 B2 * | 2/2004 | Amarasekera et al. | 524/495 |
| 6,900,264 B2 * | 5/2005 | Kumar et al. | 524/495 |
| 6,908,261 B2 * | 6/2005 | Hannay et al. | 405/231 |
| 6,936,652 B2 * | 8/2005 | van Bennekom et al. | 524/496 |
| 2002/0068170 A1 * | 6/2002 | Smalley et al. | 428/403 |
| 2003/0089890 A1 | 5/2003 | Niu et al. | 252/500 |
| 2003/0213939 A1 * | 11/2003 | Narayan et al. | 252/500 |
| 2004/0016912 A1 * | 1/2004 | Bandyopadhyay et al. | 252/500 |
| 2004/0122153 A1 * | 6/2004 | Guo et al. | 524/430 |
| 2005/0029498 A1 * | 2/2005 | Elkovitch et al. | 252/500 |
| 2005/0049355 A1 * | 3/2005 | Tang et al. | 524/496 |
| 2005/0062024 A1 * | 3/2005 | Bessette et al. | 252/500 |
| 2006/0293434 A1 | 12/2006 | Yodh et al. | |

OTHER PUBLICATIONS

Austin, P.J., "Gasification of silicone fluids under external thermal radiation Part I. Gasification rate and global heat of gasification," *Fire and Mater.*, 1998, 22, 221-237.

Barraza, H.J., et al., "SWNT-filled thermoplastic and elastomeric composites prepared by miniemulsion polymerization," *Nano Letts.*, 2002, 2, 797-802.

Beyer, G., "Short communication: carbon nanotubes as flame retardants for polymers," *Fire and Mater.*, 2002, 26, 291-293.

Du, F., oral slide presentation, "Single-Walled Carbon Nanotube/PMMA Composites", Annual Meeting of the American Physical Society, Austin, Texas, Mar. 6, 2003.

Fuchs, O., "Solvents and non-solvents for polymers," *The Polymer Handbook*, 3rd Ed., Brandrup, et al. (Eds.), , John Wiley & Sons, 1989, V11-379-VII-407.

Giannelis, E.P., "Polymer layered silicate nanocomposites," *Adv. Mater.*, 1996, 8(1), 29-35.

Gilman, J.W., "Flammability and thermal stability studies of polymer layered-silicate (clay) nanocomposites," *Applied Clay Sci.*, 1999, 15, 31-49.

Gilman, J.W., et al., "Flammability properties of polymer-layered-silicate nanocomposites. Polypropylene and polystyrene nanocomposites," *Chem. Mater.*, 2000, 12, 1866-1873.

Gilman, J.W., et al., "Nanocomposites: A revolutionary new flame retardant approach," *SMAPE J.*, 1997, 33(4), 40-46.

Google Search: "Single walled nanotubes" or "single wall nanotubes" and water . . . http://www.google.com, Jul. 20, 2003, 2 pages.

Haggenmueller, R., oral slide presentation, "SWNT—Thermoplastic Composites", Annual Meeting of the American Physical Society, Seattle, Washington, Mar. 15, 2001.

Results of search in PGPUB production database for: fibrils or nanotubes and "single wall nanotubes" or "single walled nanotubes," http://appft1.uspto.gov, Jul. 18, 2003, 2 pages.

Results of search in PGPUB production database for: "single wall nanotubes" or "single walled nanotubes" and methacrylate, http://appft1.uspto.gov, Jul. 18, 2003, 1 page.

Results of search in PGPUB production database fro: "single wall nanotubes" or "single walled nanotubes" and DMF, http://appft1.uspto.gov, Jul, 18, 2003, 1 page.

Results of search in db for: (("single wall nanotubes"or "single walled nanotubes"). and drip), http://appft1.uspto.gov, Jul. 18, 2003, 1 page.

Results of search in PGPUB production database for: "single wall nanotubes" or "single walled nanotubes" and coagulate, http://appft1.uspto.gov, Jul. 18, 2003,1 page.

(Continued)

*Primary Examiner*—Peter Szekely
(74) *Attorney, Agent, or Firm*—Woodcock Washburn LLP

(57) ABSTRACT

This invention relates to flame retardant nanocomposites and methods of reducing the flammability of polymeric compositions using nanotubes.

2 Claims, 9 Drawing Sheets

OTHER PUBLICATIONS

Results of search in PGPUB production database for: "single wall nanotubes" or "single walled nanotubes" and precipitate, http://appft1.uspto.gov, Jul. 18, 2003, 2 pages.
Results of search in PGPUB production database for: "single wall nanotubes" or "single walled nanotubes" and water and precipitate, http://appft1.uspto.gov, Jul. 18, 2003, 2 pages.
Results of search in db for: ((("single wall nanotubes" or "single walled nanotubes")and methacrylate) and precipitate), http://appft1.uspto.gov, Jul. 18, 2003,1 page.
Results of search in PGPUB production database for: ("single wall nanotubes" or "single walled nanotubes") and methacrylate and drop, http://appft1.uspto.gov, Jul, 18, 2003, 1 page.
Results of search in PGPUB production database for: ("single wall nanotubes" or "single walled nanotubes"), http://appft1.uspto.gov, Jul. 27, 2003, 2 pages.
Results of search in db for: ((flame retardant or "fire retardant") and ("single wall nanotubes" or "single walled nanotubes")), http://appft1.uspto.gov, Jul. 27, 2003, 1 page.
Results of search in PGPUB production database for: ("flame retardant" or "fire retardant") and methacrylate and (nanotubes or nanocomposite), http://appft1.uspto.gov, Jul. 27, 2003, 1 page.
Results of search in PGPUB production database for: nanotubes and (precipitate) and methacrylate, http://appft1.uspto.gov, Jul. 27, 2003, 1 page.
Results of search in PGPUB production database for: nanotubes and polymer and sonicator and precipitate, http://appft1.uspto.gov, Jul. 27, 2003, 1 page.
Results of search in PGPUB production database for: nanotubes and PMMA and DMF, http://appft1.uspto.gov, Jul. 27, 2003, 1 page.
Results of search in db for: ABST/"flame retardant or fire retardant" and nantubes, http://appft1.uspto.gov, Jul. 27, 2003, 1 page.
Results of search in 1976 to present db for: ("single wall nanotubes" or "single walled nanotubes"), http://patft.uspto.gov, Jul. 27, 2003, 2 pages.
Results of search in db for: (("single wall nanotubes" or "single walled nanotubes") and (fire or flame)), http://patft.uspto.gov, Jul. 27, 2003, 1 page.
Results for search in 1976 to present db for: (("single wall nanotubes" or "single walled nanotubes") and (methacrylate or DMF), http://patft.uspto.gov, Jul. 27, 2003, 1 page.
Results of search in db for: (("single wall nanotubes" or "single walled nanotubes") and (methacrylate and DMF)), http://patft.uspto.gov, Jul. 27, 2003, 1 page.
Results of search in db for: (("single wall nanotubes" or "single walled nanotubes") and retardant), http://patft.uspto.gov, Jul. 27, 2003, 1 page.
Results of search in 1976 to present db for: (nanocomposite and ("flame retardant" or "fire retardant"), http://patft.uspto.gov, Jul. 27, 2003, 2 pages.
Results of search in db for: ((nanotube and nanocomposite) and ("flame retardant" or "fire retardant")), http://patft.uspto.gov, Jul. 27, 2003, 1 page.
Results of search in 1976 to present db for: (nanotubes and ("flame retardant" or "fire retardant")), http://patft.uspto.gov. Jul. 27, 2003, 1 page.
Results of search in 1976 to present db for: ((methacrylate and nanotubes) and ("flame retardant" or "fire retardant")), http://patft.uspto.gov, Jul. 27, 2003, 1 page.
Results of search in db for: ((methacrylate and ("flame retardant" or "fire retardant")) and "single wall nanotubes" or single walled nanotubes)), http://patft.uspto.gov, Jul. 27, 2003, 1 page.
Results of search in 1976 to present db for: (("single wall nanotubes" or "single walled nanotubes") and water), http://patft.uspto.gov, Jul. 18, 2003, 2 pages.
Results of search in db for: ((nanotube an methacrylate) and (flame or fire)), http://patft.uspto.gov, Jul. 16, 2003, 1 page.
Results of search in 1976 to present db for: (fibrils and TTL/((flame or fire) and retardant)), http://patft.uspto.gov, Jul. 16, 2003, 2 pages.
Results of search in db for: ("carbon fibrils" and TTL/((flame or fire) and retardant)), http://patft.uspto.gov, Jul. 16, 2003, 1 page.
Results of search in db for: ("carbon fibril" and TTL/((flame or fire) and retardant)), http://patft.uspto.gov., Jul. 16, 2003, 1 page.
Results of search in 1976 to present db for: ((methacrylate and fibrils) and TTL/((flame or fire) and retardant)), http://patft.uspto.gov, Jul. 16, 2003, 1 page.
Winey, K.I., oral slide presentation, "Alignment and Dispersion of Single-Wall Nanotubes in Polymer Composites", Annual Meeting of the Materials Research Society, Boston, Massachusetts, Nov. 27, 2001.
Winey, K.I., oral slide presentation, "Nanotube-Polymer Composites", National Institute of Standarads and Technology, Gaithersburg, Maryland, May 16, 2002.
Zanetti, M., et al., "Combustion behaviour of EVA/fluorohectorite nanocomposites," *Polym. Degrad. and Stability*, 2001, 74, 413-417.
Zhu, J., et al., "Fire properties of polystyrene—clay nanocomposites," *Chem. Mater.*, 2001, 13, 3774-3780.
Chin, G., "Editor's Choice—Nanotube Firefighters," *Science*, 2005, 310,1743
Kashiwagi, T., et al., "Nanoparticle networks reduce the flammability of polymer nanocomposites," *Nature Materials*, 2005, 4, 928-933, and supplementary information, pp. 1-6.

* cited by examiner

FLAME RETARDANT NANOCOMPOSITE

CROSS REFERENCE TO RELATED APPLICATIONS

This patent application claims benefit of U.S. Provisional Application No. 60/516,614, filed Oct. 30, 2003, the entirety of which is incorporated by reference herein.

STATEMENT OF GOVERNMENT RIGHTS

The invention was made with U.S. Government support. The Government may have certain rights in the invention under one or more of Office of Naval Research Grants Nos. N00014-00-1-0720, R13572-41600001, and N00014-3-1-0890.

FIELD OF THE INVENTION

This invention relates to flame retardant nanocomposites.

BACKGROUND OF THE INVENTION

Due to their unique mechanical, thermal, and electrical properties, discrete fillers, including functionalized nanotubes, discrete carbon fibers, multi-walled nanotubes, ceramic powders, metallic nanoparticles, silicates, or single-walled carbon nanotubes, could be used for making polymeric nanocomposite materials with exceptional properties.

For example, if such fillers improved the flammability properties of polymers, they would provide an alternative to conventional flame retardants. The flame retardant (FR) effectiveness of clay-polymer-nanocomposites with various resins has been demonstrated (see, e.g., Giannelis, E., *Adv. Mater.* 1996, 8(1), 29; Gilman, J. W.; Kashiwagi, T., *SMAPE J.* 1997; 33(4), 40; Gilman, J. W., *Applied Clay Sci.* 1999; 15, 31; Zhu, J.; Morgan, A. B.; Lamelas J.; Wilkie, C. A., *Chem. Mater.* 2001; 13, 3774; Zanetti, M.; Camino, G.; Mulhaupt, R., *Polym. Degrad. Stability,* 2001; 74, 413; Gilman, J. W.; Jackson C. L.; Morgan, A. B.; Harris, R. Jr.; Manias, e.; Giannelis, E. P.; Wuthernow, M.; Hilton, D.; Phillips, S. H., *Chem. Mater.* 2000; 12, 1866). Similarly, the FR effectiveness in poly(methyl methacrylate) ("PMMA") of nanoscale silica particles (average diameter of 12 nm) has also been disclosed (Kashiwagi, T., Morgan, A. B., Antonoucci, J. M., VanLandingham, M. R., Harris, R. H., Awad, W. H. and Shields, J. R., Thermal and Flammability Properties of a Silica-PMMA Nanocomposite, *J. Appl. Poly. Sci.* Vol. 89, No. 8, 2072-2078, 2003). Likewise, multi-walled carbon nanotube/poly(propylene) composites made by shear mixing method showed a significant increase in decomposition temperature due to presence of the nanotubes (Kashiwagi, T.; Grulke, E.; Hilding, J.; Harris, R.; Awad, W.; Douglas, *J. Macromol. Rapid Commun.* 2002, 23, 761), and multi-walled carbon nanotubes have also been studied in ethylene vinyl acetate (Beyer, G., *Fire Mater.,* 2002; 26, 291).

Single-walled carbon nanotubes ("SWNTs") possess a unique combination of strength, high modulus of elasticity, and excellent heat and electrical conductivity. However, SWNTs are prone to aggregation ("bundling") due to Van der Waals attraction among the tubes, which have large surface areas. Adequate dispersion is a key factor in composite performance, and many previous attempts to uniformly disperse SWNTs throughout a polymer matrix have been less than fully successful.

It has now been discovered that a flame retardant composite can be made from SWNTs uniformly dispersed throughout a polymer matrix to form a composite.

SUMMARY OF THE INVENTION

The present invention describes flame retardant compositions comprising dispersed single walled nanotubes ("SWNTs") admixed with polymer.

The present invention also describes methods for producing flame retardant compositions having dispersed single walled carbon nanotubes, comprising contacting the SWNTs with a first fluid, combining the SWNTs and first fluid with a polymer that is soluble in the first fluid, and thereafter precipitating the polymer from the fluid, entraining the single walled carbon nanotubes within the polymer.

The present invention also provides methods of reducing the flammability of polymeric compositions, comprising: contacting single walled carbon nanotubes with a first fluid; combining the single walled carbon nanotubes and first fluid with a polymer that is soluble in the first fluid; and thereafter precipitating the polymer from the fluid, entraining the single walled carbon nanotubes within the polymer.

DETAILED DESCRIPTION

Figure 1:
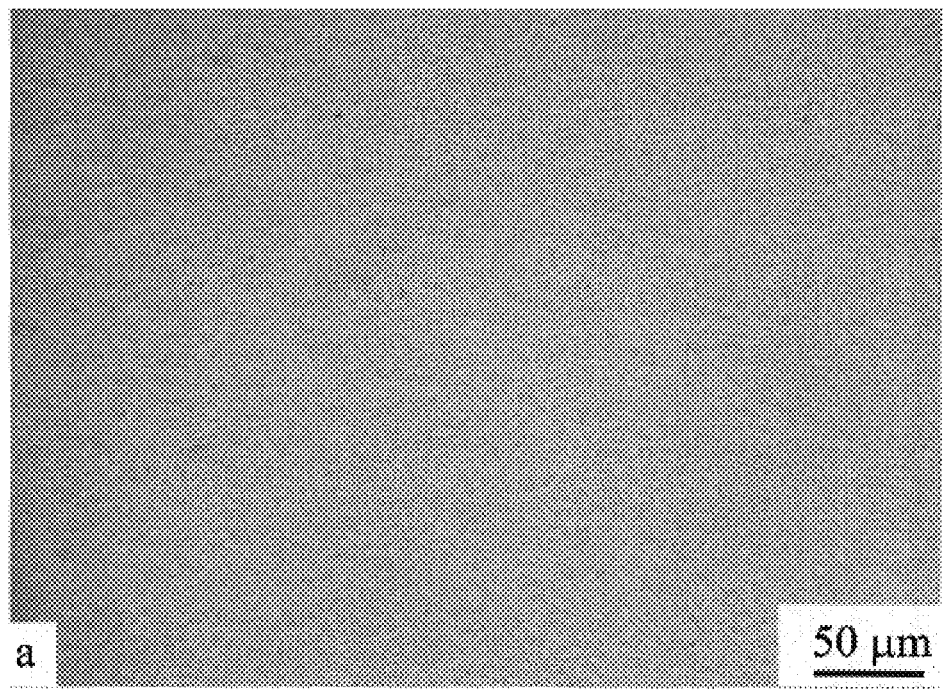
FIG. 1 is an optical micrograph of a composite.

The present invention describes a flame retardant composition comprising dispersed single walled nanotubes admixed with polymer.

SWNTs are fullerenes in the shape of a hollow tube, usually with a diameter from 0.7-2 nm. SWNTs can be formed by a variety of conventional methods, some of which are described in U.S. Pat. No. 6,544,463, the disclosure of which is incorporated herein by reference in its entirety. SWNTs can be prepared by several well known methods, including the HiPco method, and are commercially available as well, for example from the Foster Miller Company, Boston, Mass. Due to manufacturing conditions, SWNTs routinely have a residual metal content that varies in a range from about 1 wt % to about 50 wt %. These impurities can be reduced by various conventional purification methods if desired. It has been found that the purified SWNTs are best stored in some type of solvent, as opposed to being completely dried. If the purified SWNTs are completely dried before dispersion they will irreversibly aggregate. If the solvent used to store the purified SWNTs is other than the first fluid, the solvent may be partially or substantially replaced by the first fluid.

The composition preferably contains SWNTs in a weight fraction to the composition in a range from about 0.001% to about 20%. More preferably, the composition preferably contains SWNTs in a weight fraction to the composition in a range from about 0.1% to about 10%. More preferably, the composition preferably contains SWNTs in a weight fraction to the composition in a range from about 0.5% to about 5%. More preferably, the composition preferably contains SWNTs in a weight fraction to the composition in a range from about 1% to about 2%. More preferably still, the SWNTs are present in a concentration of about 1% by weight of the composition.

The polymer is at least one of poly(methyl methacrylate) ("PMMA"), poly(olefins), poly(imides), poly(amides), poly(dienes), poly(acetylenes), poly(alkenes), poly(acrylics), poly(methacrylics), poly(vinyl ethers), poly(vinyl alcohols), poly(acetals), poly(vinyl ketones), poly(vinyl halides), poly(vinyl nitrites), or poly(styrenes). Preferably, the polymer is PMMA. PMMA is available from Polysciences Inc., Warrington, Pa., with an average molecular weight of 100,000.

In one embodiment, the SWNTs can be replaced with other discrete fillers. Discrete fillers include functionalized nanotubes, discrete carbon fibers, multi-walled nanotubes, ceramic powders, metallic nanoparticles, silicates, or single-walled carbon nanotubes. Such fillers have unique mechanical, thermal, and electrical properties that would be useful in industrial applications. However, in order to be utilized in most applications, the discrete fillers must be adequately dispersed in a matrix of some type to form a composite.

According to one embodiment of the present invention, a method for producing a flame retardant composition having dispersed single walled carbon nanotubes ("SWNTs"), comprises contacting the SWNTs with a first fluid, combining the SWNTs and first fluid with a polymer that is soluble in the first fluid, and thereafter precipitating the polymer from the fluid, entraining the single walled carbon nanotubes within the polymer.

The composition preferably contains SWNTs in a weight fraction to the composition in a range from about 0.001% to about 20%. More preferably, the composition preferably contains SWNTs in a weight fraction to the composition in a range from about 0.1% to about 10%. More preferably, the composition preferably contains SWNTs in a weight fraction to the composition in a range from about 0.5% to about 5%. More preferably, the composition preferably contains SWNTs in a weight fraction to the composition in a range from about 1% to about 2%. More preferably still, the SWNTs are present in a concentration of about 1% by weight of the composition.

The first fluid is at least one of dimethylformamide ("DMF"), toluene, acetone, methanol, ethanol, methyl ethyl ketone, xylene, or water. Preferably, the first fluid is DMF. After the SWNTs are placed in the first fluid, they are dispersed, for example by sonication.

The polymer is at least one of poly(methyl methacrylate) ("PMMA"), poly(olefins), poly(imides), poly(amides), poly(dienes), poly(acetylenes), poly(alkenes), poly(acrylics), poly(methacrylics), poly(vinyl ethers), poly(vinyl alcohols), poly(acetals), poly(vinyl ketones), poly(vinyl halides), poly(vinyl nitriles), or poly(styrenes). Preferably, the polymer is PMMA. PMMA is available from Polysciences Inc., Warrington, Pa., with an average molecular weight of 100,000. PMMA is soluble in DMF.

In one embodiment of the method, the step of precipitating the polymer is achieved by contacting the SWNT/PMMA/DMF mixture with a second fluid, wherein the polymer is not soluble in the second fluid.

Preferably, the volume of the first fluid is in a ratio of about 1:5 with the second fluid. The second fluid is at least one of dimethylformamide ("DMF"), toluene, acetone, methanol, ethanol, methyl ethyl ketone, xylene, or water. When the first fluid is DMF and the polymer is PMMA, preferably, the second fluid is distilled water. Selection of the first fluid, polymer, and second fluid will be guided by three principles: 1) the polymer should be substantially soluble in the first fluid; 2) the polymer should be substantially insoluble in the second fluid; and 3) the first fluid should be substantially miscible with the second fluid. The solubilities and miscibilities of the foregoing fluids and polymers are well known to those of skill in the art. Although all means of contacting the SWNT/PMMA/DMF mixture with the second fluid are contemplated, the mixture is preferably added drop-wise into the second fluid.

Due to its insolubility in the second fluid, the polymer will coagulate and precipitate, thereby entraining the SWNTs in the polymer. This prevents the SWNTs from bundling again. The precipitated SWNT composite can be filtered and dried, and then manipulated by conventional means, such as a hot press, to form a desired shape, for example, fibers or films.

In another embodiment, methods of reducing the flammability of polymeric compositions are provided. These methods typically include contacting single walled carbon nanotubes with a first fluid; combining the single walled carbon nanotubes and first fluid with a polymer that is soluble in the first fluid; and thereafter precipitating the polymer from the fluid, entraining the single walled carbon nanotubes within the polymer. Any of the polymers, nanotubes and fluids described herein are suitable for reducing the flammability of polymeric compositions.

The present invention is further described in the following examples.

EXAMPLES

Example 1

Production of SWNT Composites

Single-walled carbon nanotubes for the composites were produced by the HiPco method. The metal content of the SWNTs was about 8 wt % determined by thermal gravimetric analysis (TGA) using a TA Instruments SDT 2960 at 5° C./min in air. Factors such as residual metal content, length, and alignment in the composite all affect the performance properties of the composite, depending on the intended use.

PMMA (poly(methyl methacrylate)) was procured from Polysciences Inc., Warrington, Pa., with an average molecular weight of 100,000.

SWNTs and PMMA were combined in DMF in the amounts necessary to form the desired weight percentage ("wt %"). For example to produce 1 wt % SWNT composite, 60 mg SWNTs and 5.94 g PMMA were added to 240 ml dimethylformamide (DMF). The mixture was then sonicated for 24 hours to obtain a good dispersion of SWNTs in the solvent. The homogeneous suspension was then dripped into a large amount of distilled water ($V_{DMF}:V_{water}=1.5$) in a blender. The PMMA precipitated immediately due to its insolubility in water. The precipitation of PMMA entrapped the SWNTs and prevented SWNTs from bundling again. After filtration and drying under vacuum at 120° for 24 hours, the 1 wt % SWNT composite was obtained.

Pure PMMA polymer samples were also produced by the same methods, but in the absence of SWNTs.

Example 2

Characterization of Dispersion

The method of Example 1 was used to produce a 1 wt % SWNT composite. A hot press was used to prepare a film of ~30 μm thickness which was observed with an optical microscope to determine SWNT dispersion. As shown in the optical micrograph in FIG. 1, there was no bundling or coagulation of SWNTs in the composite.

Figure 2:
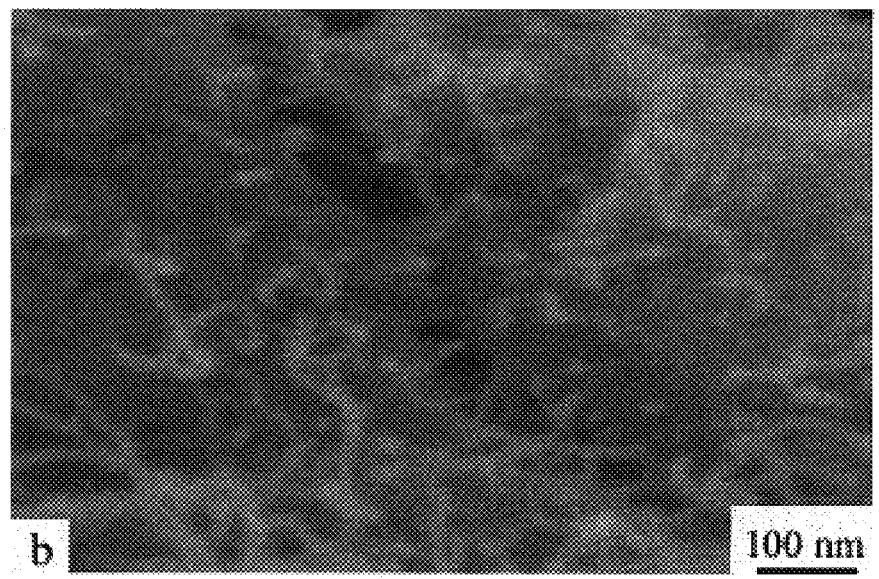
FIG. 2 is a scanning electron micrograph of a composite.

The method of Example 1 was used to produce a 7 wt % SWNT composite. The fracture surface was observed with a scanning electron microscope ("SEM"; JEOL 6300FV at 5 kV voltage) to determine SWNT dispersion. As shown in the SEM micrograph in FIG. 2, there was no bundling or coagulation of SWNTs in the composite.

Figure 3:
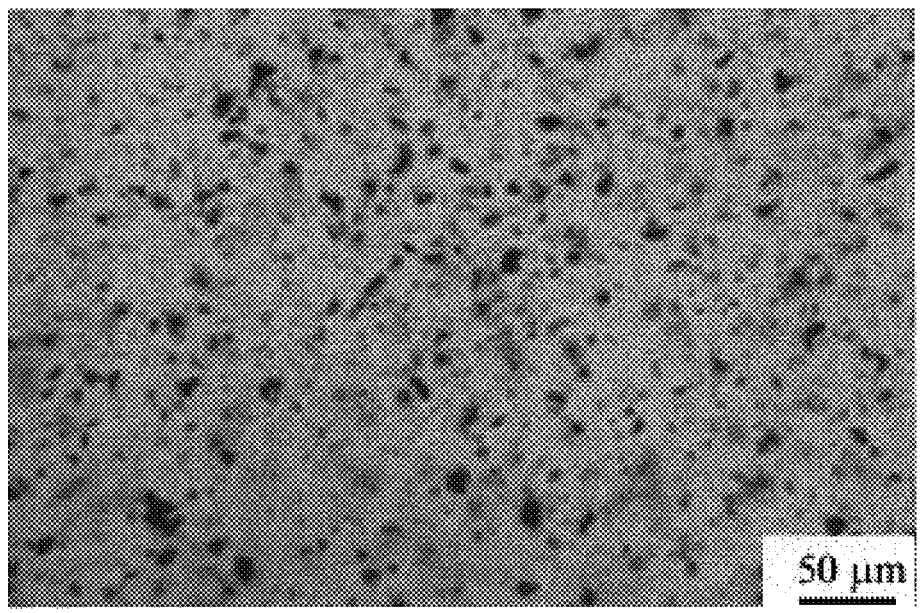
FIG. 3 is an optical micrograph of a composite.

If purification is undertaken, and if the purified SWNTs are completely dried before dispersion they will irreversibly aggregate, as shown in FIG. 3, where a 1 wt % SWNT composite made with completely dried purified SWNTs was made and observed with an optical microscope. Thus, purified SWNTs are best stored in some type of solvent, as opposed to being completely dried.

Figure 4:
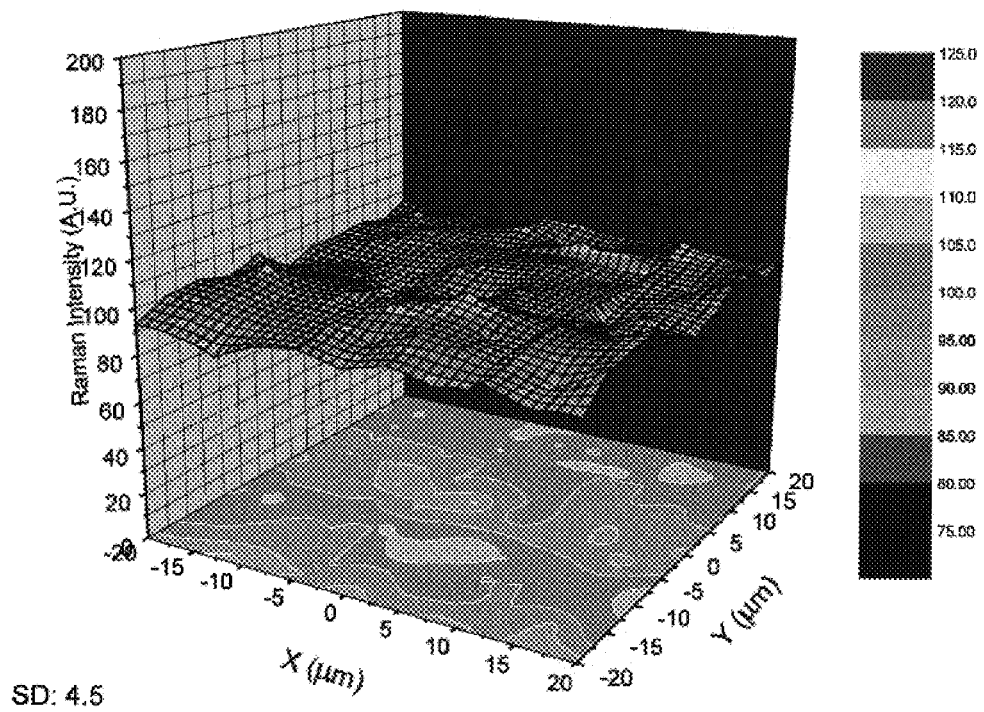
FIG. 4 is a graph of Raman intensity for a composite.

FIG. 4 is a Raman image of a 1 wt % SWNT/PMMA film sample with a standard deviation of 4.5, indicating a good dispersion of SWNTs in the polymer matrix. Raman intensity map can be created by performing 2D point-by-point Raman scan. In principle, the Raman intensity should be proportional to the total number of SWNTs in the sampling volume, thus the intensity map is equivalent to the SWNT distribution map within the surface layer of the sample. Using a Renishaw Ramanscope 1000 system equipped with 514.5 nm, 633 nm and 780 nm laser sources with an auto-focusing feature, the spatial resolution was tuned to one micron. The Raman image of a SWNT/PMMA composite film using 514.5 nm laser excitation was shown in FIG. 4, with a scanning area of 40 μm×40 μm (laser spot size and step size are both 1 um). Integrated intensities of Raman G band (from 1450 $cm^{-1}$ to 1650 $cm^{-1}$) on the baseline were used to create the Raman map. The intensities were further normalized to an average of 100 (A.U.) and the standard deviation (SD) of the intensities was calculated to quantitatively describe the degree of the homogeneity of SWNT dispersion in the polymer matrix. Ten Raman maps collected from the same PMMA composite sample at different regions produce similar standard deviations within an error bar of ±10%.

Example 3

Properties of Composites

The method of Example 1 was used to produce unaligned SWNT/PMMA composites in the weight percentages listed in TABLE 1. Pure PMMA polymer samples (0.0 SWNT wt %) were also produced by the same method, but without adding SWNTs.

Electrical conductivity was measured using either the conventional four-probe or conventional two-probe method at room temperature, the latter being used for electrical conductivities less than $10^{-8}$ S/cm.

Thermal stability was determined by thermal gravimetric analysis (TGA) using a TA Instruments SDT 2960 at 5° C./min in air from 25° C. to 800° C. in air. All samples were ~2.0 $mm^3$. TABLE 1 reports the temperature of the maximum rate of mass loss.

TABLE 1

| SWNT wt % | Electrical Conductivity (S/cm) | Thermal Stability (° C.) |
|---|---|---|
| 0.0 | $10^{-15}$ (theoretical value) | 311 |
| 0.1 | $<10^{-12}$ | 362 |
| 0.5 | $<10^{-12}$ | 371 |
| 1 | $~10^{-11}$ | 372 |
| 2 | $5 \times 10^{-5}$ | 372 |
| 5 | $1.4 \times 10^{-4}$ | 373 |
| 7 | $2.6 \times 10^{-4}$ | 373 |

Figure 5:
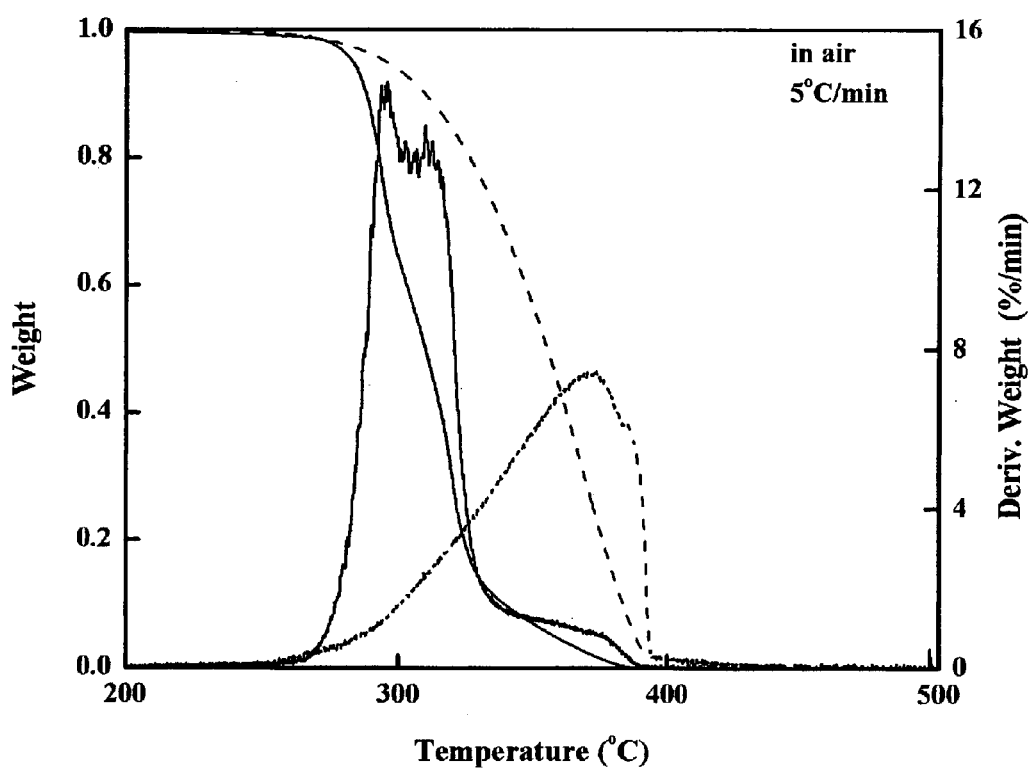
FIG. 5 is a graph showing mass loss rate curves for a standard and a composite according to the present invention.

A comparison of the mass loss rate curves between the pure PMMA polymer sample and the 0.5 wt % SWNT composite is shown in FIG. 5. The results show that the samples begin to lose weight at the same temperature, but the maximum rate of mass loss is only ~7.8%/min for the 0.5 wt % SWNT composite (dashed line), as compared to 14.5%/min for the pure PMMA polymer sample (solid line). Also, the temperature at the maximum rate of mass loss for the composite was 372° C., approximately 61° C. higher than the pure PMMA polymer sample.

Example 5

Carbon Fiber Composite

Figure 6:
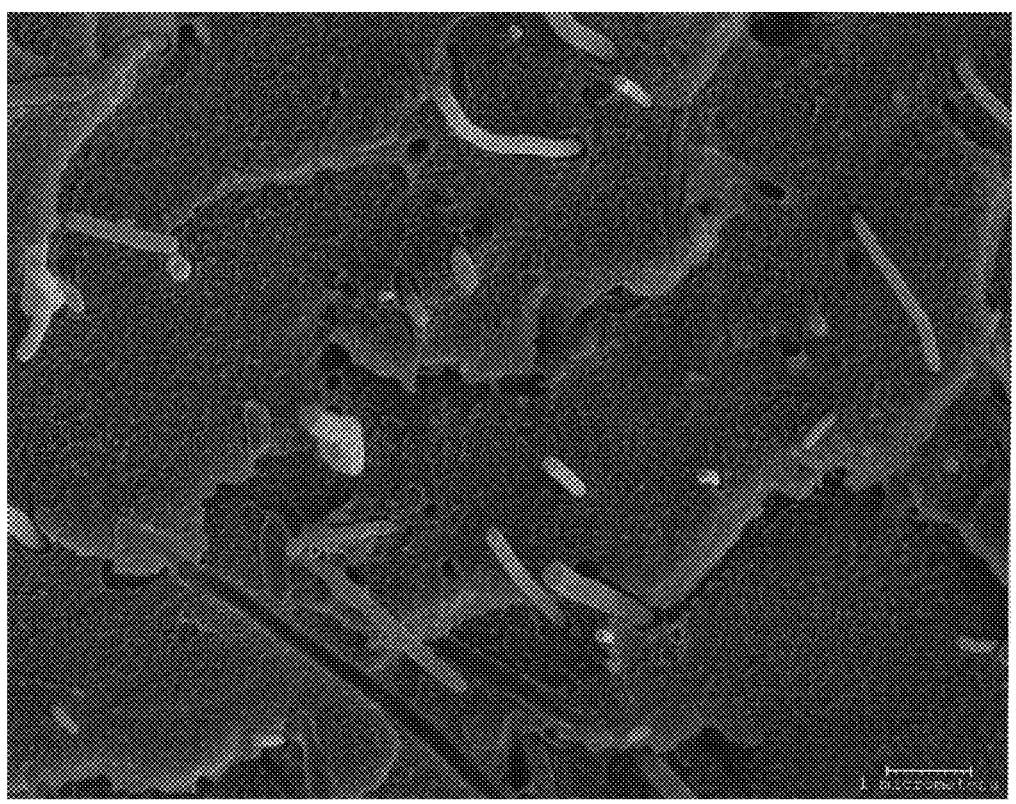
FIG. 6 is a scanning electron micrograph of another composite according to the present invention.

The method of Example 1 (except that SWNTs were replaced with carbon fiber) was used to produce a 5% carbon fiber/PMMA composite. The fracture surface was observed with a scanning electron microscope ("SEM"; JEOL 6300FV at 5 kV voltage) to determine carbon fiber dispersion. As shown in the SEM micrograph in FIG. 6, there was no aggregation of carbon fiber in the composite.

Example 6

Heat Release

The method of Example 1 was used to produce a 1 wt % SWNT composite. A pure PMMA polymer sample was also produced. All samples were compression molded at 210° C. under pressure of 6 metric tons to make 75 mm diameter by 2.4 mm thick disks.

A Cone Calorimeter was used to carry out measurements of flammability properties following the procedure defined in ASTM E 1354-90. The procedure involved exposed samples wrapped with aluminum foil (except on the top surface) in a horizontal orientation at an external radiant flux of 50 kW/$m^2$. This flux corresponds to typical heat fluxes in a medium-sized fire. The standard uncertainty of the measured heat release rate is ±10%.

Figure 7:
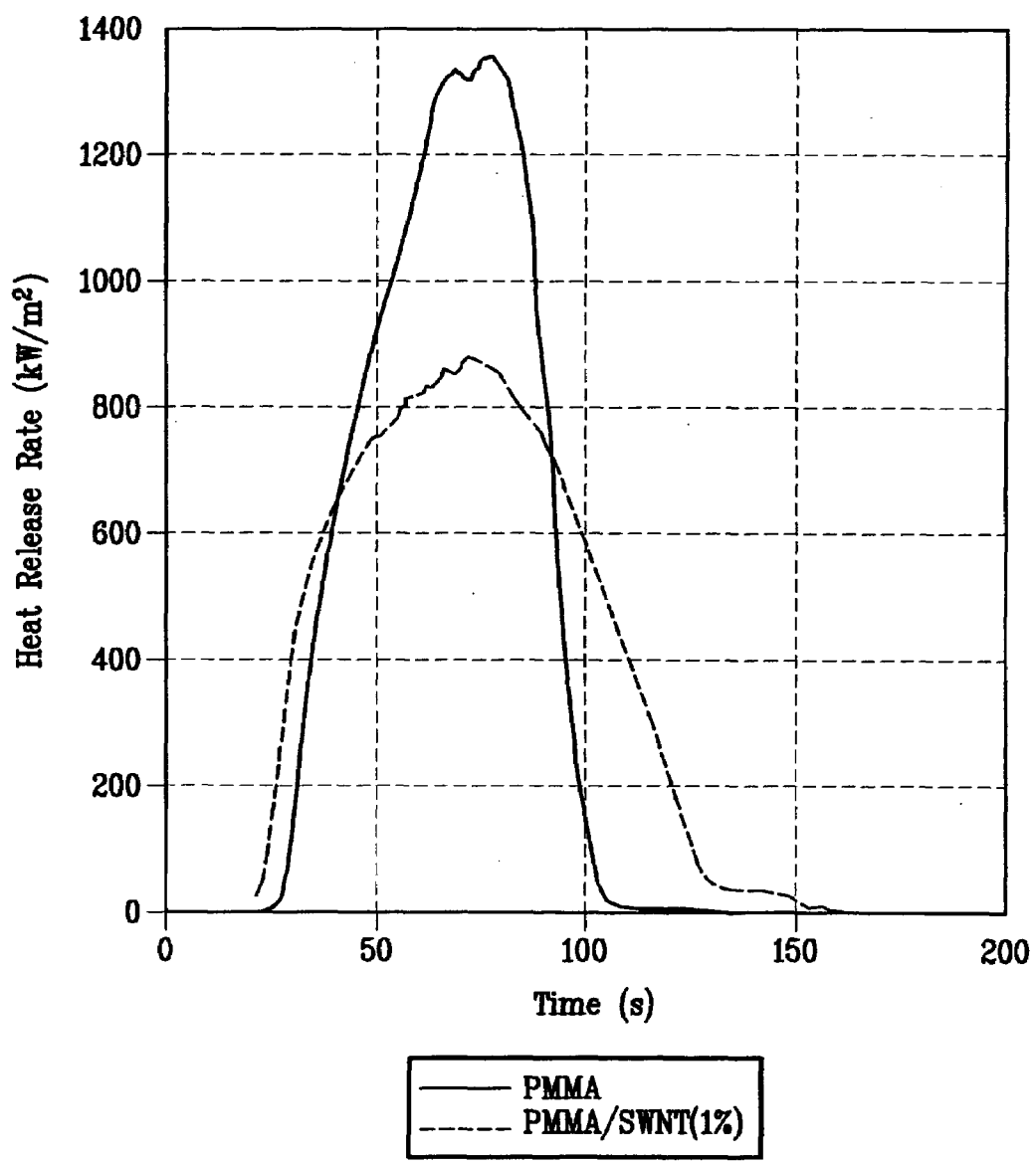
FIG. 7 is a graph showing heat release curves for a standard and a nanocomposite according to the present invention.

A comparison of heat release rate curves between a pure PMMA polymer sample and the 1 wt % SWNT composite is shown in FIG. 7. The results show that the heat release rate of the 1 wt % SWNT composite is significantly lower than that of pure PMMA polymer sample even though the amount of SWNT is only 1% by mass. For example, the peak heat release rate of the 1 wt % SWNT composite is about 38% lower than that of pure PMMA polymer sample. The results indicate that the presence of well-dispersed single-walled nanotubes in PMMA/SWNT nanocomposites significantly reduces the heat release rate of PMMA.

The total heat release, the integral of the heat release rate curve over the duration of the experiment, is about the same for the two samples.

Example 7

Mass Loss Rate

The method of Example 1 was used to produce a 1 wt % SWNT composite. A pure PMMA polymer sample was also produced by the same method (but in the absence of SWNTs). All samples were compression molded at 210° C. under pressure of 6 metric tons to make 75 mm diameter by 2.4 mm thick disks.

A radiant gasification apparatus ("RGA"), somewhat similar to the Cone Calorimeter, was designed and constructed at NIST, National Institute of Standards and Technology, Gaithersburg, Md., to study of gasification processes of samples by measuring mass loss rate and temperatures of the sample in a nitrogen atmosphere (no burning) (See Austin, P. J., Buch, R. R., and Kashiwagi, T., *Fire Mater.*, 1998; 22, 221). All experiments were conducted at 50 kW/m$^2$. Results obtained from the RGA are based only on the condensed phase processes due to the absence of any gas phase oxidation reactions and processes. The RGA enables visual observations of gasification behavior under a radiant flux similar to that of a fire without any interference from a flame, and the external flux to the sample surface is well-defined and nearly constant over the duration of an entire experiment due to the absence of heat feedback from a flame. The standard uncertainty of the measured mass loss rate is within 10%.

The gasification behavior of the pure PMMA polymer sample and 1 wt % SWNT composite were observed and their mass loss rates were measured in a nitrogen atmosphere. Vigorous bubbling over the entire surface of the pure PMMA polymer sample was observed shortly after the sample was exposed to an external radiant flux of 50 kW/m$^2$. The pure PMMA polymer sample appeared to be liquid-like during most of the test period.

In contrast, the 1 wt % SWNT composite did not change significantly in size and appeared solid during the most of the test period except for the formation of numerous, very small bubbles shortly after the start of the exposure to external radiant flux.

Figure 8:
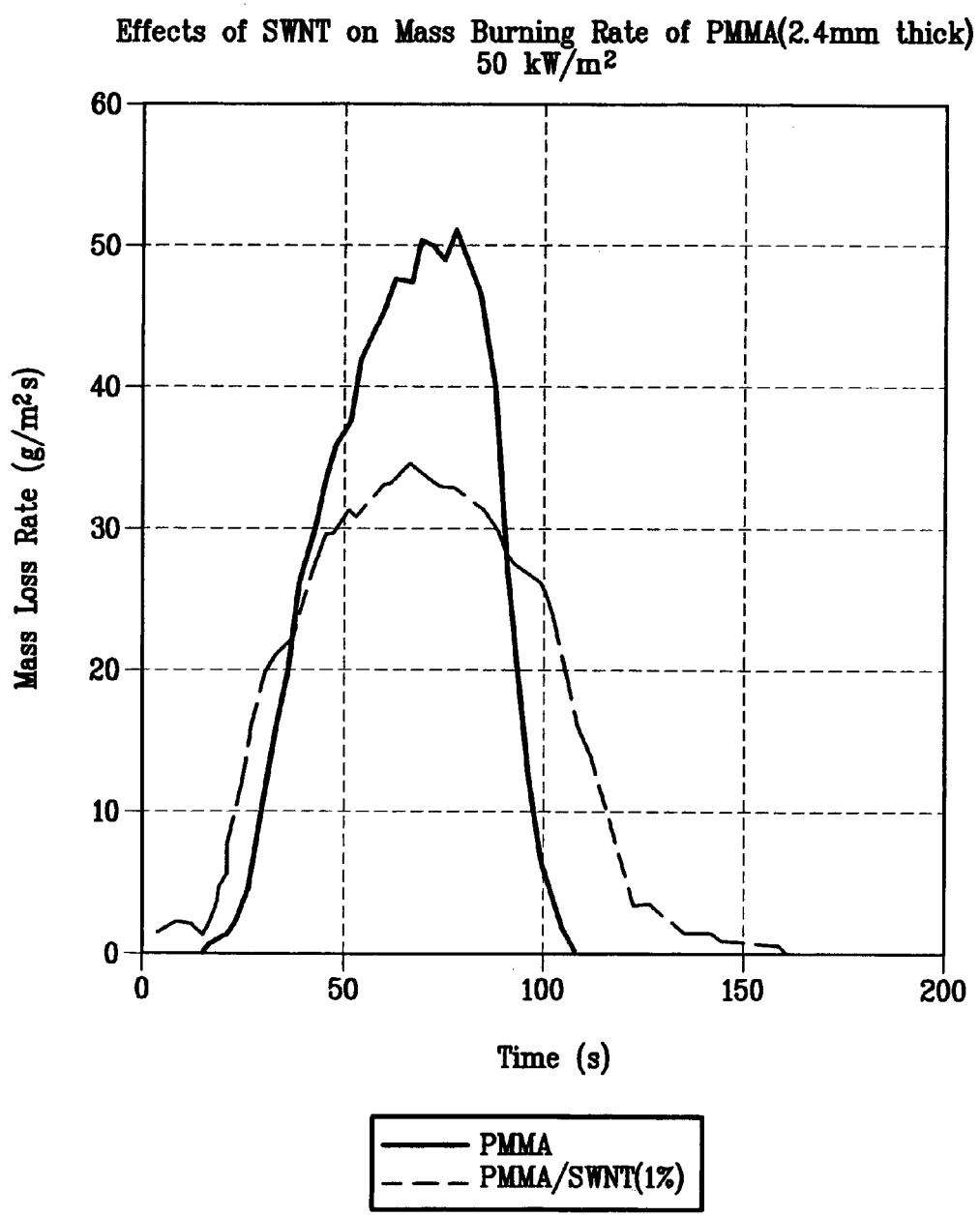
FIG. 8 is a graph showing mass loss rate curves for a standard and a nanocomposite according to the present invention.

The mass loss rate curves of the two samples are shown in FIG. 8. The results show very similar trends to the heat release rate curves shown in FIG. 7. Both indicate earlier heat release and mass loss for the 1 wt % SWNT composite compared to the pure PMMA polymer sample and lower peak values in heat release rate and mass loss rate for the 1 wt % SWNT composite. The peak mass loss rate of the 1 wt % SWNT composite was about a 30% reduction from that of the pure PMMA polymer sample. The peak mass burning rate (mass loss rate of the sample during burning) of the 1 wt % SWNT composite was about 33 g/m$^2$s (compared to about 23 g/m$^2$s in nitrogen) and that for the pure PMMA polymer sample was about 50 g/m$^2$s (compared to about 34 g/m$^2$s in nitrogen). This difference in mass loss rate between the burning case and gasification case in nitrogen is due to the additional energy feedback from the flame to the sample surface.

The curves of the mass loss rate per unit surface area (during burning) for the two samples are very similar to those of the heat release rate. Since the specific heat of combustion value is calculated by dividing measured heat release rate with measured mass loss, rate, this indicates that the specific heat of combustion is about the same for the two samples. The calculated specific heat of combustion of each sample is 24±2 MJ/kg. The above results indicate that the 1 wt % SWNT composite burns significantly slower than the pure PMMA polymer sample but both burn nearly completely. The estimated energy feedback rate from the differences in mass loss rates is in the rage of 21 kW/m$^2$-24 kW/m$^2$. The comparison of the results between the heat release rate curves and mass loss ate curves, and the nearly same specific heat of combustion of the two samples indicate that the flame retarding mechanism of SWNT in PMMA is mainly due to chemical and physical processes in the condensed phase.

Example 8

Appearance After Gasification

Figure 9:
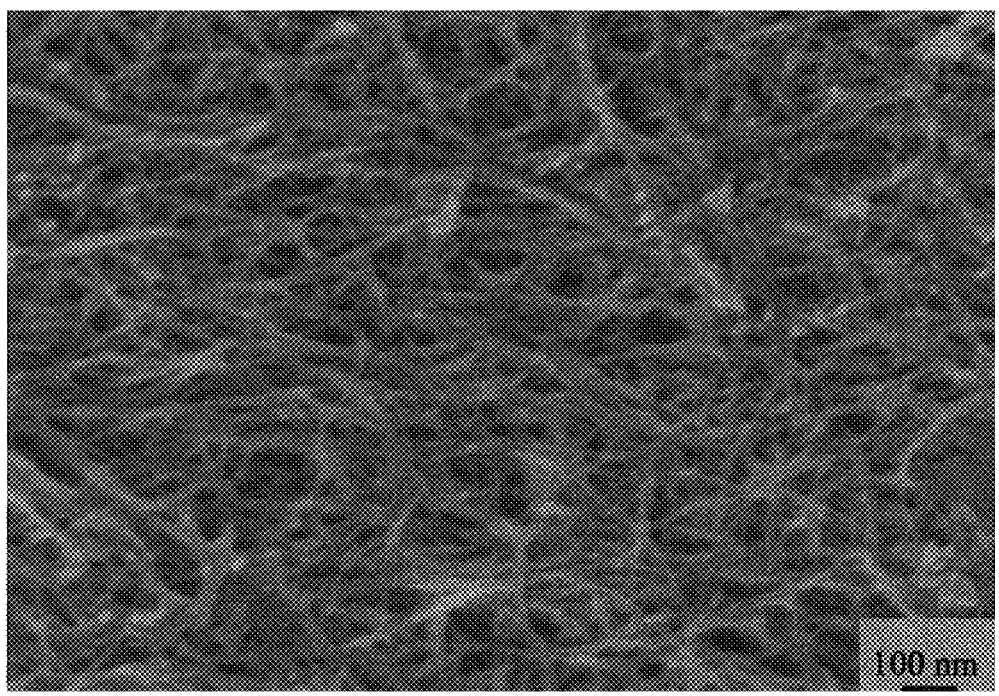
FIG. 9 is a scanning electron micrograph of a nanocomposite according to the present invention after gasification.

Morphology of the nanotubes in the composite after nitrogen gasification was investigated using scanning electron microscopy (SEM; JEOL 6300FV) at 1 kV voltage without any coating. In this study, the accumulation of carbon tubes with a network structure is observed in the black residue collected after the end of the gasification test, as shown in FIG. 9. The dimension of the black residue was nearly the same as that of the original 1 wt % SWNT composite sample and covered the entire bottom surface of the sample container without any cracks. The formation of the network tends to increase mechanical integrity of the protective layer which can then effectively act as a shield of the virgin polymer resin by not exposing the resin to the external heat flux and thus serve as a thermal insulation layer. It is believed that it is important for the network structure of carbon nanotubes to cover the entire sample surface to shield it from the external heat flux, and thus the SWNT must be well dispersed.

The disclosures of each patent, patent application, and publication cited or described in this document are hereby incorporated herein by reference, in their entireties.

Each recited range includes all combinations and subcombinations of ranges, as well as specific numerals contained therein.

Various modifications of the invention, in addition to those described herein, will be apparent to those skilled in the art from the foregoing description. Such modifications are also intended to fall within the scope of the appended claims.

What is claimed is:

1. A method for producing a flame retardant composition having dispersed single walled carbon nanotubes, comprising:

contacting the single walled carbon nanotubes with a first fluid comprising dimethylformamide;

combining the single walled carbon nanotubes and first fluid with poly(methyl methacrylate) that is soluble in the first fluid to form a mixture; and thereafter precipitating the poly(methyl methacrylate) from the fluid and entraining the single walled carbon nanotubes within the precipitating polymer by adding the mixture to a second fluid in which the poly(methyl methacrylate) is not soluble.

2. A flame retardant composition produced by the method of claim 1.

* * * * *

UNITED STATES PATENT AND TRADEMARK OFFICE
CERTIFICATE OF CORRECTION

PATENT NO. : 7,265,175 B2 Page 1 of 1
APPLICATION NO. : 10/977642
DATED : September 4, 2007
INVENTOR(S) : Karen I. Winey et al.

It is certified that error appears in the above-identified patent and that said Letters Patent is hereby corrected as shown below:

Title Page,
Item (56) References Cited Col. 2, line 28,
OTHER PUBLICATIONS:
"Results of search in PGPUB production database fro:" reference, delete "fro:" and insert -- for: --.
Col. 1, line 31, Page 2, "Results of search in db for: ABST/"flame retardant or fire retardant"," reference, delete "nantubes," and insert -- nanotubes, --.
Col. 2, line 35, Page 2, "Winey, K.I., oral slide presentation," reference, delete "Standarads" and insert -- Standards --.

Column 8,
Line 6, delete "rage" and insert -- range --.
Line 8, delete "ate" and insert -- rate --.

Signed and Sealed this

Eleventh Day of November, 2008

JON W. DUDAS
*Director of the United States Patent and Trademark Office*